US007630680B2

(12) United States Patent
Nishitani et al.

(10) Patent No.: US 7,630,680 B2
(45) Date of Patent: Dec. 8, 2009

(54) IMAGE FORMING APPARATUS WITH MOVABLE RECORDING DETECTING DEVICE

(75) Inventors: Shuji Nishitani, Shizuoka-ken (JP); Kazuhiro Nishimura, Chichibu (JP)

(73) Assignee: Canon Kabushiki Kaisha, Tokyo (JP)

( * ) Notice: Subject to any disclaimer, the term of this patent is extended or adjusted under 35 U.S.C. 154(b) by 534 days.

(21) Appl. No.: 11/538,659

(22) Filed: Oct. 4, 2006

(65) Prior Publication Data

US 2007/0127963 A1 Jun. 7, 2007

(30) Foreign Application Priority Data

Oct. 5, 2005 (JP) ............................. 2005-291893
Sep. 27, 2006 (JP) ............................. 2006-262854

(51) Int. Cl.
*B65H 1/12* (2006.01)
*G02G 15/00* (2006.01)

(52) U.S. Cl. ........................ 399/393; 399/389; 400/624

(58) Field of Classification Search ................. 399/393, 399/389

See application file for complete search history.

(56) References Cited

U.S. PATENT DOCUMENTS 7,077,589 B2 7/2006 Fujibayashi et al.
7,083,245 B2 8/2006 Yamamoto
7,224,493 B2 * 5/2007 Chelvayohan et al. ....... 358/405
2004/0046309 A1 * 3/2004 Lee et al. .................... 271/121

FOREIGN PATENT DOCUMENTS

JP 6-218998 A 8/1994
JP 10-329984 A 12/1998
JP 11005649 A * 1/1999
JP 2004-2017 A 1/2004
JP 2004-212693 A 7/2004
JP 2005-22095 A 1/2005

* cited by examiner

*Primary Examiner*—Daniel J Colilla
(74) *Attorney, Agent, or Firm*—Canon USA Inc IP Div

(57) ABSTRACT

An image forming apparatus controls an image forming device on the basis of outputs from a detecting device for detecting a recording material accommodated in a storage device. The detecting device faces a recording material supporting member, and is able to come in contact with the recording material supported on the recording material supporting member. A supporting portion that supports the detecting device so as to be rotatable and a holding portion that holds the supporting portion so as to be movable allow for reliable and stable detection of the recording material by the detecting device even when the position of the recording material supporting member is changed.

10 Claims, 6 Drawing Sheets

IMAGE FORMING APPARATUS WITH MOVABLE RECORDING DETECTING DEVICE

BACKGROUND OF THE INVENTION

1. Field of the Invention

The present invention relates to image forming apparatuses such as copiers, printers, and facsimiles, and in particular, relates to apparatuses including detecting devices for detecting recording materials.

2. Description of the Related Art

An apparatus for controlling an image forming section on the basis of detection results produced by a sheet detecting unit disposed before the image forming section, for example, before a transferring position at which images are transferred onto a sheet, is disclosed in, for example, Japanese Patent Laid-Open No. 10-329984.

Such a sheet detecting unit generally includes a sensor disposed on a sheet-feeding route for detecting sheets, and detects a sheet while the sheet is carried after being separated from the other stacked sheets.

Some types of sheet require time before being detected by the sensor and the optimum image forming conditions are set. When the distance to the image forming section becomes longer for the detection and the setting, the entire apparatus becomes disadvantageously larger. The sheets may be temporarily stopped at a predetermined position on the feeding route for the time required for sheet detection, but it takes too much time to form images on only one sheet.

To avoid this, an apparatus disclosed in Japanese Patent Laid-Open No. 2004-2017 detects sheets at a position of a sheet cassette that is located at the most upstream portion of the sheet-feeding route. In this apparatus, the sensor moves linearly, and thus can correctly detect the sheets regardless of the volume of stacked sheets.

However, the sensor in the apparatus disclosed in Japanese Patent Laid-Open No. 2004-2017 does not face a pressure plate that pushes the sheets against a feeding roller. Therefore, small-sized sheets that are mainly stacked at the position of the pressure plate may not be detected. The pressure plate changes the inclination of the sheets according to the volume of the stacked sheets. However, the sensor according to Japanese Patent Laid-Open No. 2004-2017 cannot respond to the inclination change.

SUMMARY OF THE INVENTION

The present invention is directed to an image forming apparatus in which a distance from a detecting device to an image forming section is increased without increasing the size of the apparatus, and is capable of stably detecting a recording material regardless of the size of the recording material.

According to one aspect of the present invention, an image forming apparatus includes an image forming device configured to form an image on a recording material; a storage device adapted to accommodate the recording material; a detecting device configured to detect the recording material accommodated in the storage device; a supporting portion supporting the detecting device so as to be rotatable; and a holding portion holding the supporting portion so as to be movable. The storage device includes a movable recording material supporting member supporting the recording material thereon. The image forming device is controlled on the basis of detection outputs from the detecting device. The detecting device is positioned facing the recording material supporting member and is able to come into contact with the recording material supported on the recording material supporting member.

According to one aspect of the present invention, an image forming apparatus includes an image forming device configured to form an image on a recording material; a storage device adapted to accommodate the recording material; a detecting device configured to detect the recording material accommodated in the storage device; The storage device includes a recording material supporting member supporting the recording material thereon. The image forming device is controlled on the basis of detection outputs from the detecting device. The recording material supporting member is rotatable about a supporting point, the detecting device is positioned facing the recording material supporting member.

Further features of the present invention will become apparent from the following description of exemplary embodiments with reference to the attached drawings.

DESCRIPTION OF THE EMBODIMENTS

Exemplary embodiments of the present invention will now be described in detail with reference to the drawings. However, the dimensions, materials, shapes, relative arrangements, and the like of the components described in these exemplary embodiments do not limit the scope of the present invention unless otherwise specified.

First Exemplary Embodiment

An image forming apparatus according to a first exemplary embodiment of the present invention will now be described with reference to the drawings. First, the structure and the operation of the image forming apparatus will be described, and then a sheet detecting apparatus, which is an essential part of the present invention, will be described in detail.

[Structure of Image Forming Apparatus]

Figure 1:
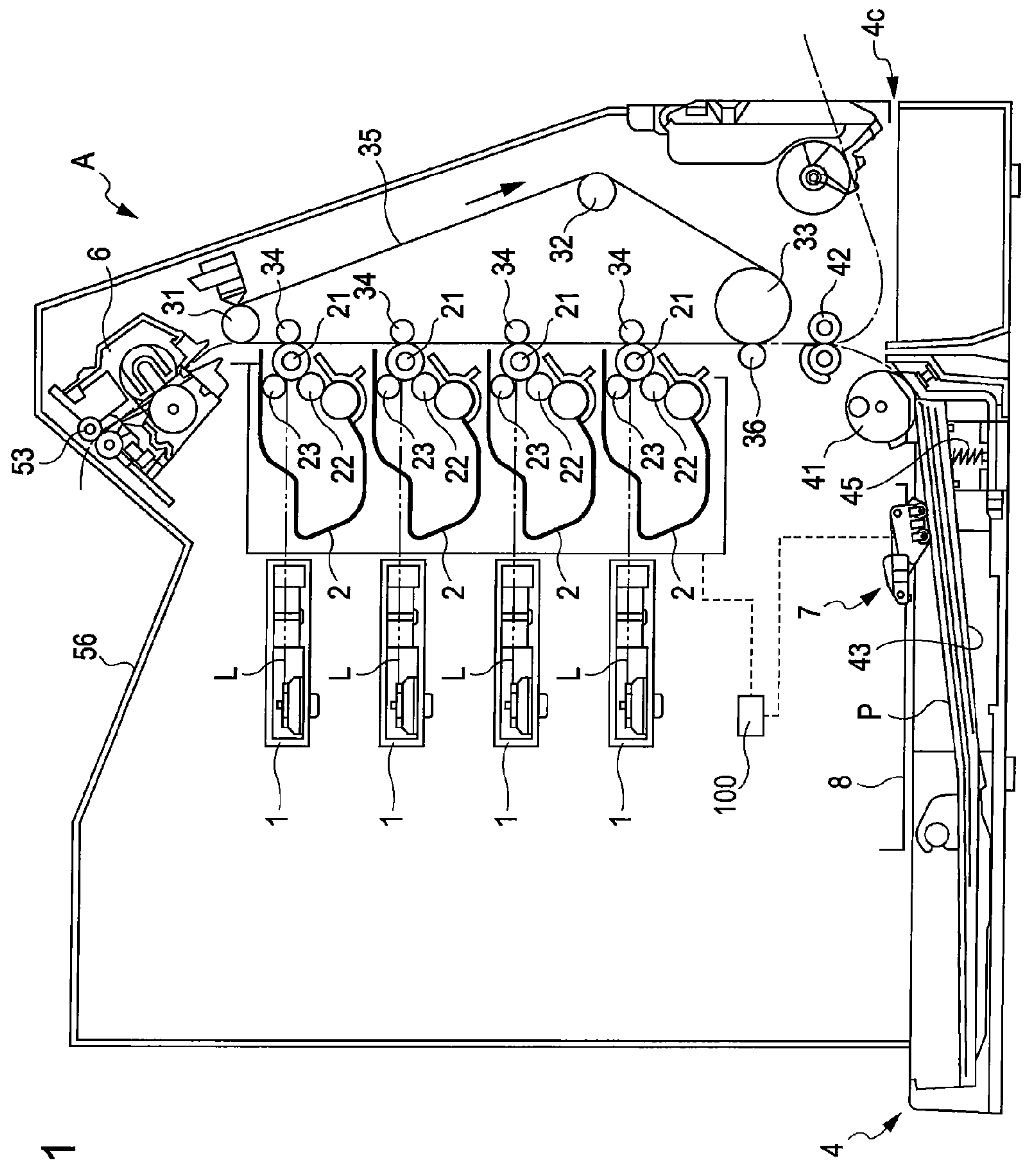
FIG. 1 illustrates an image forming apparatus according to an exemplary embodiment of the present invention.

FIG. 1 schematically illustrates an image forming apparatus according to an exemplary embodiment of the present invention. In this exemplary embodiment, a color laser printer is employed as an example of the image forming apparatus.

As shown in FIG. 1, an image forming apparatus A includes image forming sections each corresponding to four colors of yellow (Y), magenta (M), cyan (C), and black (BK). The image forming sections each include devices such as an image bearing member 21 that rotates at a constant speed, a charging device (charging roller) 23 that electrifies the image bearing member 21, an optical scanning device 1 for forming electrostatic latent images on the image bearing member 21, and a developing device (developing roller) 22 that produces toner images from the electrostatic latent images. Processing units such as the image bearing member 21, the charging roller 23 that electrifies the image bearing member 21, and the developing roller 22 are integrated into a process cartridge 2. The process cartridges 2 are independently detachable from the printer body (body of the image forming apparatus).

Moreover, a carrying device (carrying belt) 35 for carrying sheets P serving as recording materials that are fed from a feeding cassette 4 serving as a storage device that accommodates the recording materials is disposed so as to face the image forming sections such that the toner images developed at the image forming sections are successively transferred to and overlapped on the sheets P by transferring sections. A fixing section 6 for fixing the transferred toner images to the sheets P is disposed downstream of the sheet-feeding direction from the carrying belt 35. Furthermore, an ejecting section such as an ejecting tray 56 is disposed downstream of the sheet-feeding direction from the fixing section 6. The image forming sections, the transferring sections, the fixing section, and the like form an image forming device.

Next, the structures of the image bearing member 21 and the carrying belt 35 will be described in detail. The image bearing member (photosensitive drum) 21 and the developing roller 22 are integrated in a container. The process cartridges 2 are supported so as to be detachable from the printer body, and are independently exchangeable with ease according to the lifetime of the image bearing members 21. The image bearing members 21 according to this exemplary embodiment are photosensitive drums that are formed of aluminum cylinders each having an organic photoconductor layer applied on the outside thereof, and are supported by the containers of the process cartridges 2 so as to be rotatable.

Moreover, the image bearing members 21 are rotated in the counterclockwise direction in the drawing by the driving force of a first driving motor according to the image forming operation. Moreover, the developing rollers 22 are rotated by a second driving motor, and the peripheral speed of the developing rollers can be arbitrarily set.

The carrying belt 35 is rotated in the clockwise direction in the drawing in synchronization with the peripheral speed of the image bearing members 21. The sheets P fed from the feeding cassette 4 are electrostatically retained on the carrying belt, and are successively carried to the transferring sections. Transferring members (transferring rollers) 34 face the corresponding image bearing members 21 having the carrying belt 35 interposed therebetween, and pressurized portions between the image bearing members 21 and the transferring rollers 34 serve as the transferring sections. The toner images formed on the image bearing members 21 are transferred to and overlapped on the sheets P disposed on the carrying belt 35 by applying voltages to the transferring rollers 34.

The carrying belt 35 is supported by three rollers, i.e., a driving roller 31, a tension roller (extension roller) 32, and a counter roller 33, so as to be movable around these three rollers. The sheets P are adhered to the carrying belt by an adhesion member (adhesion roller) 36.

The carrying belt 35 is rotated in the clockwise direction in the drawing by the driving force of a third driving motor according to the image forming operation.

[Operation of the Image Forming Apparatus]

With the above-described structure, the image forming apparatus A operates as follows.

First, the sheets P stacked on the feeding cassette 4 are fed from the feeding cassette 4. This operation will now be described.

A sheet detecting apparatus 7 (described below) determines the presence and type of the sheets P accommodated in the feeding cassette 4. One of the sheets P is separated from the other sheets by a feeding unit (feeding roller) 41, and then carried to registration rollers 42. The feeding roller serves as a feeding member that feeds a sheet to the image forming device.

On the other hand, toner images are formed on the image bearing members 21 in the image forming sections. This operation will now be described.

Each of the image bearing members 21 is rotated at a predetermined peripheral speed (processing speed). First, the surfaces of the image bearing members 21 are uniformly electrified by the charging devices (charging rollers) 23. Next, the image bearing members 21 are exposed to laser light L using the optical scanning devices 1. In this manner, electrostatic latent images are formed on the image bearing members 21. The developing rollers 22 are driven at the same time as the electrostatic latent images are formed.

Next, toner is applied to the electrostatic latent images on the image bearing members 21 by the developing rollers 22. When the toner is applied to the electrostatic latent images, voltages having the same polarity and substantially the same potential as those of the image bearing members 21 are applied to the developing rollers 22. With this, toner images of four colors are formed on the corresponding image bearing members 21.

Subsequently, the toner images formed in the image forming sections are transferred to the carrier sheet P, and thus images are formed on the sheet P. This operation will now be described.

The sheet P fed from the registration rollers 42 is supported and carried on the carrying belt 35. When the sheet P reaches positions at which the sheet P faces the image bearing members 21, voltages having a polarity opposite to that of the toner images are applied to the corresponding transferring roller 34. Thus, the toner images are attracted and transferred to the sheet P.

This transferring step is performed at each image forming section such that the toner images of four colors are transferred to and overlapped on the sheet P. In the case of multilayer transfer, the toner images need to be transferred to the sheet P at a timing such that the leading edges of the toner images on the sheet P coincide with each other. In this manner, full-color images are formed on the sheet P.

Subsequently, the sheet P is separated from the carrying belt 35, and carried to the fixing section 6. The unfixed toner images transferred to the sheet P are heated and pressurized in the fixing section 6. With this, the toner images are fixed on the sheet P. The sheet P is then ejected through a pair of ejecting rollers 53 to the ejecting tray 56 located at the upper portion of the printer body while the image side faces downward. Thus, a series of image forming operations is completed. In this manner, the image forming device forms images on the sheet.

[Sheet Detecting Apparatus]

The structures of the sheet detecting apparatus and the feeding cassette in the vicinity of the sheet detecting apparatus related to the features of the present invention will now be described in detail.

First, the structure of the feeding cassette concerned with the sheet detecting apparatus will be described.

Figure 2:
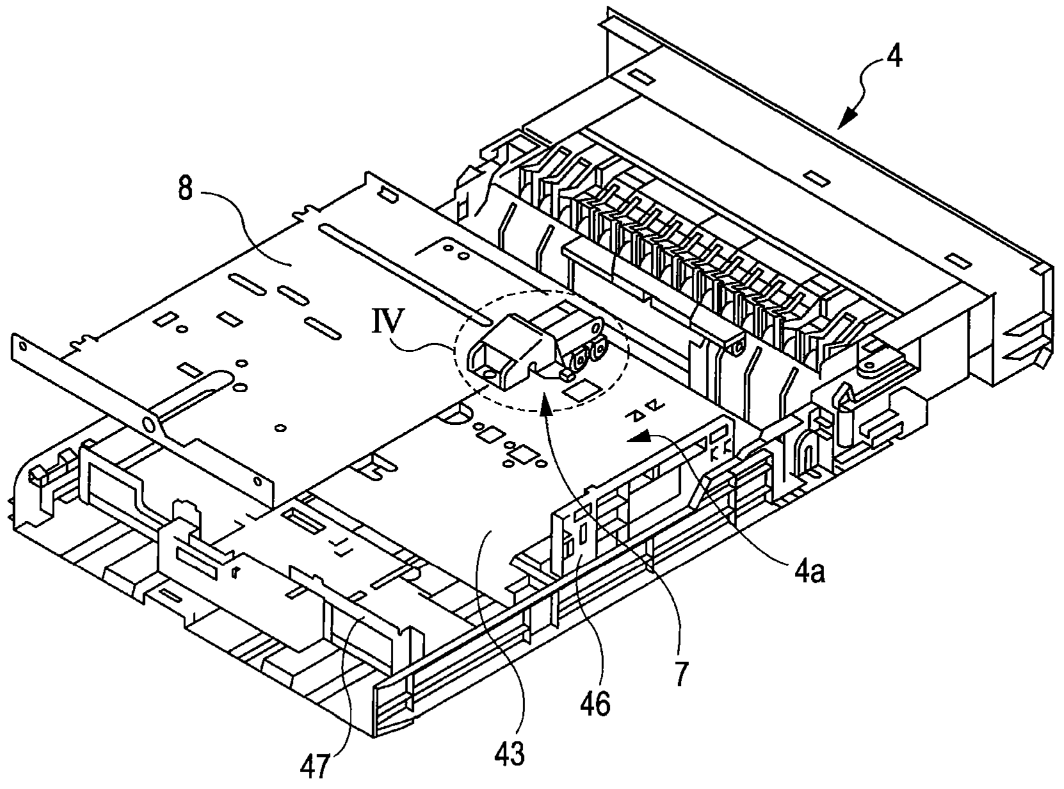
FIG. 2 is a perspective view of a feeding cassette including a sheet detecting apparatus.
Figure 3A:
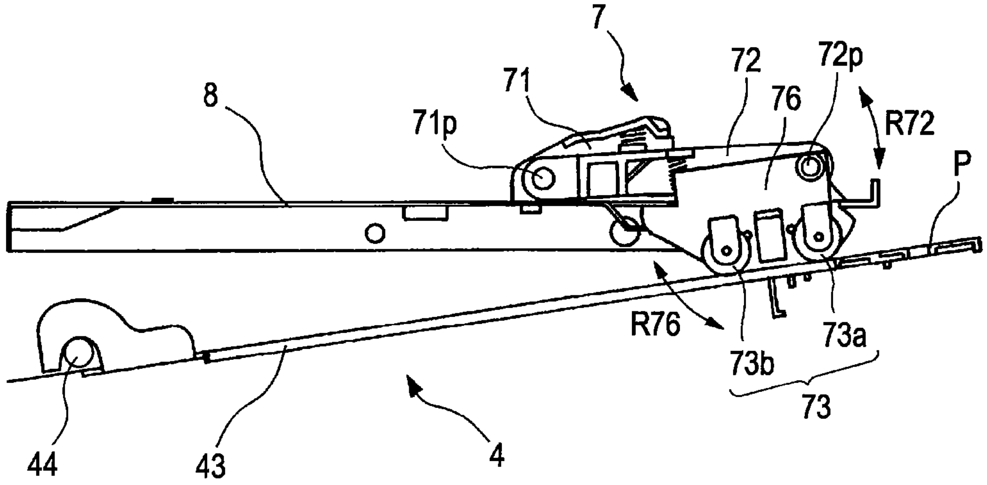
FIGS. 3A and 3B illustrate operations of the sheet detecting apparatus in the feeding cassette.
Figure 3B:
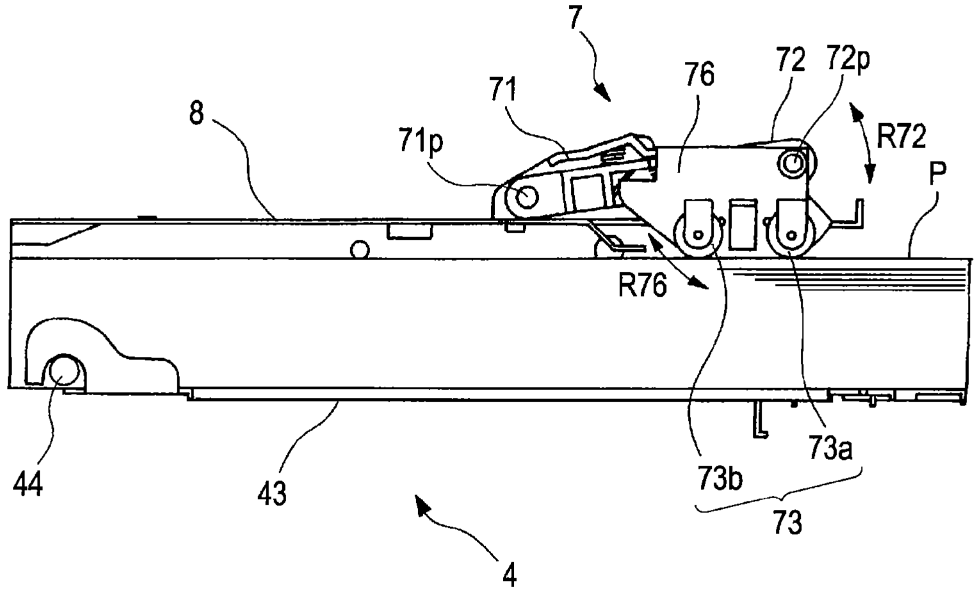

FIG. 2 is a perspective view of the entire feeding cassette, and FIGS. 3A and 3B illustrate operations of the feeding cassette and the sheet detecting apparatus during feeding of a sheet.

As shown in FIG. 2, the feeding cassette 4 includes a storage section **4*a* for accommodating sheets, sheet guides, a drawer handle, an outer covering, a display (a paper-size indicator), and the like. The feeding cassette 4** is detachable from the body of the image forming apparatus.

The storage section 4*a* includes a sheet supporting plate (a recording material supporting member) for supporting the stacked recording materials 43. The sheet supporting plate is movable and rotatable (pivotable) about a fulcrum (a supporting point) 44, and is biased toward the feeding roller 41 by an elastic member 45 such as a spring. Thus, the sheets P stacked on the sheet supporting plate 43 are reliably brought into contact with the feeding roller 41 as shown in FIG. 1 regardless of the volume of the stacked sheets.

The sheet supporting plate 43 includes a separating member (separating sheet) facing the feeding roller 41. The frictional resistance between the separating sheet and a sheet P is larger than that between two sheets P. Therefore, only the top sheet P is sent to the feeding roller 41, and the other sheets P are maintained on the sheet supporting plate 43 even when the volume of the sheets P is small as shown in FIG. 3A. That is, the sheets P are reliably separated into individual sheets.

The storage section 4*a* includes a side-regulating member (side-regulating plate) 46 that regulates the sides of the sheets P (both ends of the sheets in the direction perpendicular to the sheet-feeding direction, i.e., in the width direction) stacked on the sheet supporting plate 43. Moreover, the storage section 4*a* includes a trailing-end regulating member (trailing-end regulating plate) 47 that regulates the trailing ends of the sheets P. With these components, the position of the sheets P in the storage section 4*a* is maintained.

A frame 8 that is integrated into the body of the image forming apparatus is disposed above the storage section 4*a*. The sheet detecting apparatus 7 for detecting the sheets P accommodated in the storage section 4*a* is fixed to the frame 8.

Figure 4:
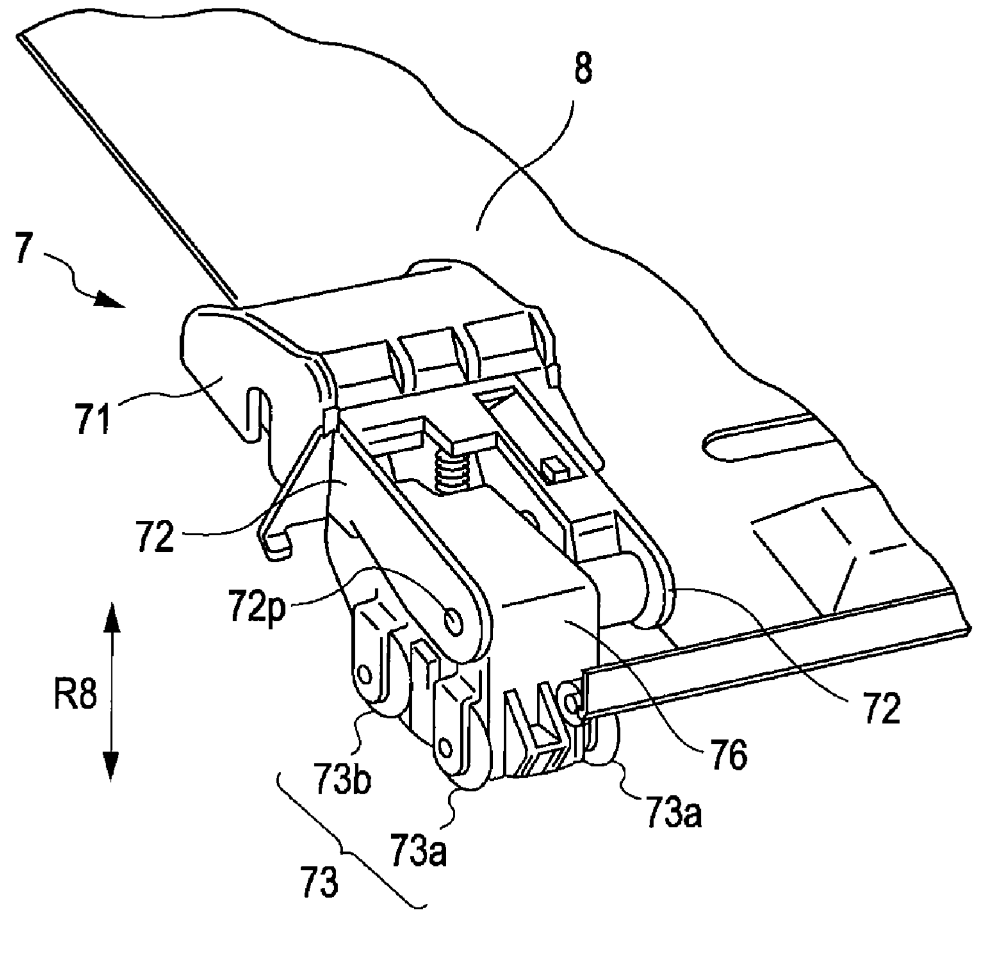
FIG. 4 is a perspective view of the sheet detecting apparatus.
Figure 5A:
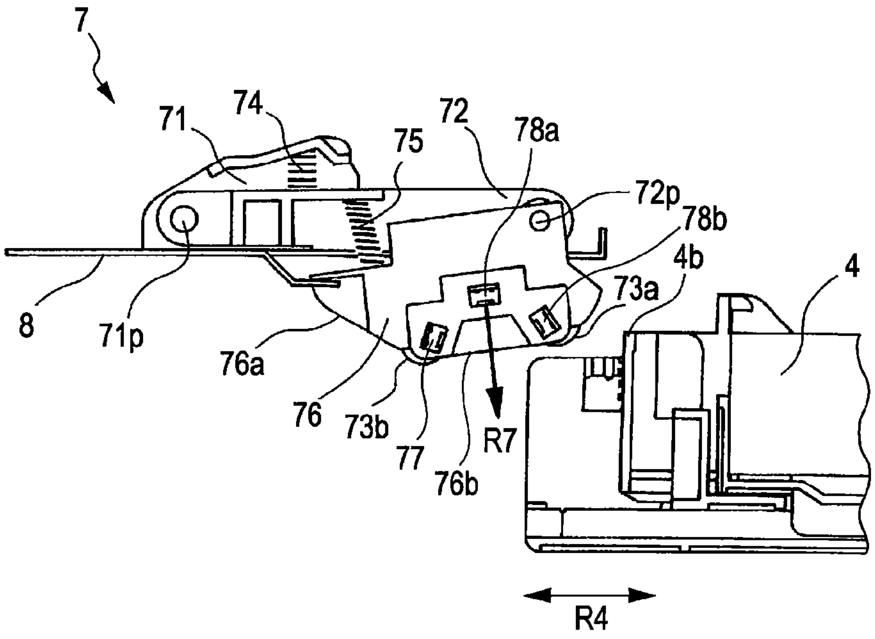
FIGS. 5A and 5B are cross-sectional views when the feeding cassette is extracted or inserted.
Figure 5B:
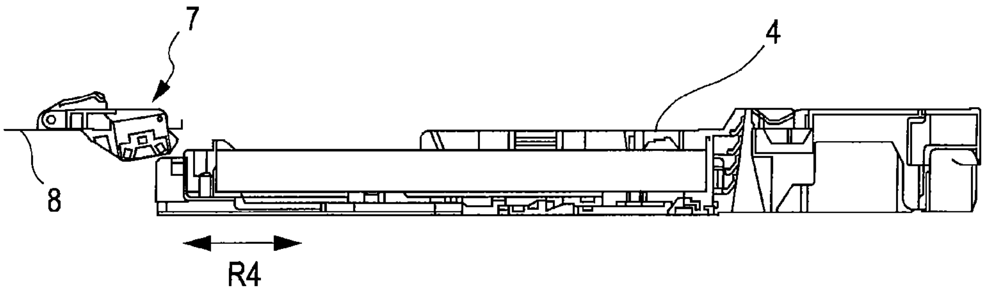

Next, the structure of the sheet detecting apparatus 7 will be described. FIG. 4 is a perspective view of the sheet detecting apparatus 7, and FIGS. 5A and 5B are cross-sectional views when the feeding cassette 4 is extracted or inserted.

The sheet detecting apparatus 7 is of a two-link structure having two fulcrums of rotation. The sheet detecting apparatus 7 mainly includes a base 71, arms 72, and a sensor 76 serving as a detecting device.

The sensor 76 includes a light-emitting portion 77 and two light-receiving portions 78*a* and 78*b* for detecting the sheets P accommodated in the feeding cassette 4. That is, the sensor 76 emits light from the light-emitting portion 77 to the sheets, and receives light reflected from the sheets by the light-receiving portions 78*a* and 78*b* so as to detect and determine the presence, the type, and the like of the sheets. The light-receiving portion 78*a* receives light diffusely reflected from the sheets, and the light-receiving portion 78*b* receives light regularly reflected from the sheets. The output from the sensor 76 controls the image forming device. A control device 100 (see FIG. 1) receives the output from the sensor 76, and controls image forming conditions for the image forming device.

Moreover, the sensor 76 includes rotating members (wheels) 73 that are brought into contact with the sheets P. That is, the sensor 76 is disposed so as to face the sheet supporting plate 43, and can be brought into contact with the sheets P stacked on the feeding cassette 4. Moreover, in this exemplary embodiment, the sensor 76 is disposed so as to face the sheet supporting plate 43. Therefore, the sensor 76 can detect easily the small-sized sheet.

The arms 72 are rotatable about a hinge 71*p* serving as a fixed fulcrum (first rotation supporting point), and the sensor 76 is rotatable about a hinge 72*p* serving as a movable fulcrum (second rotation supporting point). That is, the arms have a fixed fulcrum and a movable fulcrum, and are held by the base 71 serving as a holding portion so as to be movable (rotatable); whereas the sensor has a movable fulcrum, and is supported by the arms 72 serving as a supporting portion so as to be rotatable.

Moreover, an arm-biasing member (spring) 74 serving as a first biasing member is disposed between the base 71 and the arms 72, and a sensor-biasing member (spring) 75 serving as a second biasing member is disposed between the arms 72 and the sensor 76. That is, the first biasing member biases the arms from the base to the sheets, and the second biasing member biases the sensor from the arms to the sheets so as to increase the relative angle between the arms and the sensor.

The base 71 of the sheet detecting apparatus 7 is integrally fixed to the frame 8 of the printer body. On the other hand, the arms 72 are connected to the base 71 via the hinge 71*p* so as to be rotatable, and the sensor 76 is connected to the arms 72 via the hinge 72*p* so as to be rotatable. With this structure, the arms 72 and the sensor 76 can rotate in the directions of double-headed arrows R72 and R76 (see FIGS. 3A and 3B), respectively, with a specific amount of freedom of rotation using the weights thereof and the biasing force that supports the weights. This leads to the stabilization of the positions of the arms 72 and the sensor 76.

Therefore, as shown in FIGS. 3A and 3B, the sensor 76 of the sheet detecting apparatus 7 can be appropriately positioned (postured) on the sheets P via the contact of the four wheels 73 of the sensor 76 with the sheets P regardless of the volume of the sheets. Moreover, the distance between the sensor 76 and the sheets P can be appropriately set using the wheels 73.

In this manner, the posture of the sensor and the distance between the sensor and the sheets can be appropriately set, and the presence and type of the sheets P can be correctly determined.

As described above, the determination is performed while the wheels 73 are in contact with the sheets P. Therefore, all the four wheels 73 are in contact with the sheets P. In this exemplary embodiment, the wheels 73 of the sensor 76 are reliably brought into contact with the sheets P as described below. Herein, two of the wheels 73 disposed in the anterior position (downstream of the moving direction of the recording materials) are referred to as front wheels 73*a*, and the other two disposed in the posterior position (upstream of the moving direction of the recording materials) are referred to as rear wheels 73*b*.

Specifically, the biasing force of the spring 74 is larger than that of the spring 75 such that the wheels 73 of the sensor 76 are reliably brought into contact with the sheets P. More specifically, the force F1 of the spring 74 applied to the front wheels 73*a* of the sensor 76 via the arms 72 is larger than the force F2 of the spring 75 applied to the rear wheels 73*b* of the sensor 76.

With this, the front wheels 73*a* are biased toward the sheets P more strongly than the rear wheels 73*b*, and thus all the wheels 73 of the sensor 76 are reliably brought into contact with the sheets P.

Moreover, a gap is provided between the shaft of the hinge 72*p* that connects the sensor 76 with the arms 72 and a hole into which the shaft is fitted. Therefore, the shaft can be inclined with respect to the hole, and the sensor 76 that is integrated with the shaft can also be inclined with the inclination of the shaft. Thus, the sensor 76 can move a certain distance in the directions of a double-headed arrow R8 shown in FIG. 4 (vertical direction; direction perpendicular to the shaft). With this, the wheels 73 can be brought into contact with the sheets P more reliably, resulting in the stable detection of the sheets P.

Moreover, as shown in FIGS. 5A and 5B, the feeding cassette 4 is extracted from or inserted into the body of the image forming apparatus in the directions of a double-headed arrow R4 during the supplying of sheets or clearing of paper jams. According to the structure of the sensor 76 in this exemplary embodiment, the shock to the sensor 76 during the extraction or insertion of the feeding cassette 4 can be absorbed, and the accuracy of the sheet detection can be maintained. This will be described below.

First, when the feeding cassette 4 is inserted into the body of the image forming apparatus and the feeding cassette 4 passes below the sheet detecting apparatus 7, a contact portion (butting portion) 4*b* located in the upper portion of the feeding cassette 4 is first brought into contact with the wheels 73 of the sensor 76 of the sheet detecting apparatus 7. Moreover, the reading direction of the sensor 76 (the direction of an arrow R7), i.e., the direction perpendicular to a detecting surface 76*b* of the sensor 76 (roughly speaking, the direction connecting a portion to be detected by the sensor and the light-receiving portion 78*a*), is inclined toward a loading slot (fitting slot) 4*c* of the feeding cassette 4 (see FIG. 1) by the weight of the sensor 76 and the biasing force of the springs 74 and 75. That is, the detecting direction of the sensor 76 is inclined toward the loading slot 4*c* of the feeding cassette 4 before the feeding cassette 4 is fitted into the body of the image forming apparatus.

With this, the sensor 76 can be readily rotated about the hinge 72*p* during fitting of the feeding cassette 4. As a result, the sheet detecting apparatus 7 including the sensor 76 can be smoothly retracted upward.

Moreover, when the feeding cassette 4 is extracted from the body of the image forming apparatus, the contact portion 4*b* of the feeding cassette 4 is first brought into contact with a tapered portion 76*a* of the sheet detecting apparatus 7. With this, the tapered portion 76*a* of the sensor 76 prevents the contact portion 4*b* of the feeding cassette 4 from being caught by the sensor 76, and the sheet detecting apparatus 7 including the sensor 76 can be smoothly retracted upward.

With this structure, the shock to the sensor 76 of the sheet detecting apparatus 7 given by the extraction or insertion of the feeding cassette 4 can be minimized. Moreover, the operability of the feeding cassette 4 is not impaired since the sheet detecting apparatus 7 is smoothly retracted upward during the extraction or insertion of the feeding cassette 4 as described above.

Moreover, in this exemplary embodiment, the sheet detecting apparatus 7 is disposed above the storage section 4*a* of the feeding cassette 4 so as to directly detect the sheets P in the feeding cassette 4.

When the detection of the sheets is performed after the sheets have been conveyed through the registration rollers as in the known technology, a space is required for a detection unit, resulting in an increase in the size of the entire apparatus.

In this exemplary embodiment, the sheet detecting apparatus 7 is disposed above the feeding cassette 4 as described above. Therefore, no space is required between the registration rollers 42 and the adhesion roller 36 shown in FIG. 1. This space reduction can lead to a reduction in the size of the entire apparatus.

Moreover, when the detection of the sheets is performed immediately before the transfer of the toner images as in the known technology, the sheets may pass through the image forming sections and the image-fixing section before the control device 100 sends optimum signals based on the sheet detection to the image forming sections and the image-fixing section. In this exemplary embodiment, the detection of the sheets is performed at the storage section 4*a*, and thus the control device 100 can send the optimum signals to the image forming sections and the image-fixing section in good time before the sheets P reach the image forming sections after the detection. Thus, optimum image formation and image fixation can be performed.

Moreover, in this exemplary embodiment, the arms and the sensor are pivotable about the shafts serving as fulcrums. Therefore, the position of the sensor can be changed with the inclination of the sheet supporting plate (or the sheets), resulting in correct sheet detection.

Second Exemplary Embodiment

Figure 6:
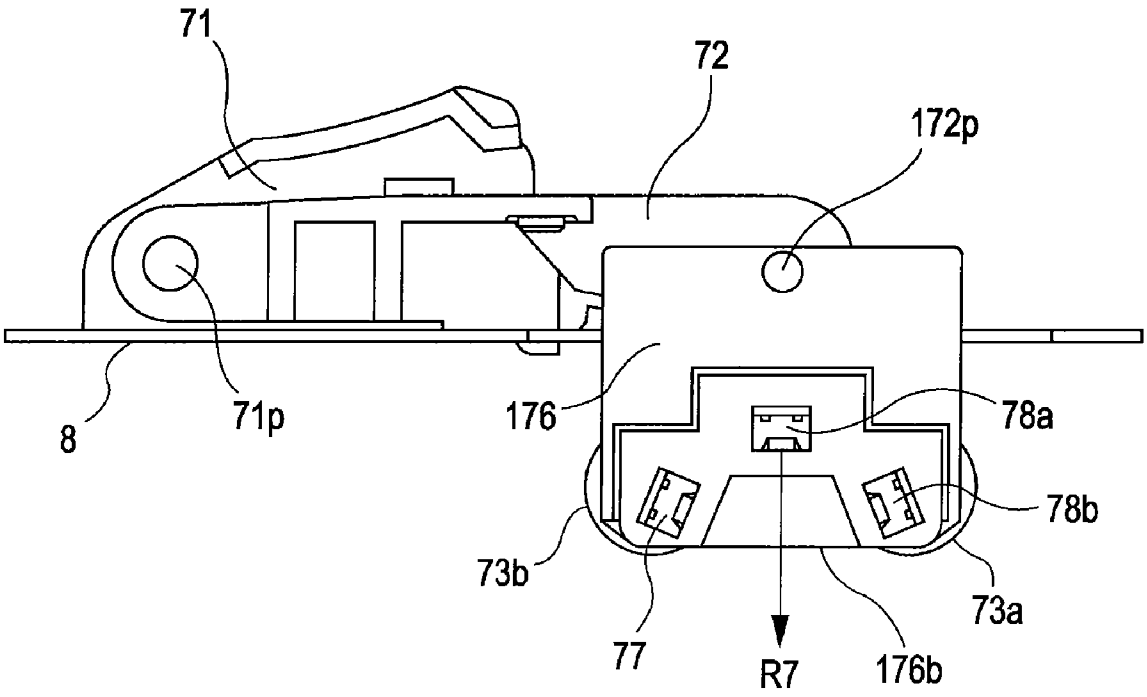
FIG. 6 illustrates a sheet detecting apparatus according to another exemplary embodiment of the present invention.

A second exemplary embodiment of the present invention will now be described with reference to the drawings. FIG. 6 illustrates the structure of the sheet detecting apparatus 7 according to the second exemplary embodiment. The same reference numerals are used for components substantially the same as those in the first exemplary embodiment, and the description thereof will be omitted.

In the first exemplary embodiment, the hinge 72*p* of the sensor 76 is provided such that the reading direction R7 of the sensor is inclined toward the loading slot 4*c* of the feeding cassette 4.

In this exemplary embodiment, a hinge 172*p* serving as a center of rotation of a sensor 176 is disposed substantially in the center of the sensor 176 such that the reading direction R7 of the sensor 176, i.e., the direction perpendicular to a detecting surface 176*b* of the sensor 176 (roughly speaking, the direction connecting a portion to be detected by the sensor and the light-receiving portion 78*a*), is oriented in the vertical direction by the weight of the sensor before the feeding cassette 4 is fitted into the body of the apparatus.

With this structure, springs for biasing the arms and the sensor are not required, and the number of parts can be reduced.

Moreover, in this exemplary embodiment, the hinge 172*p* is disposed in the upper portion of the center of the sensor 176 such that the forces given to the front wheels 73*a* and the rear wheels 73*b* are balanced by the weights thereof. Moreover, when the sheets P are brought into contact with the lower portion of the sensor 176, the sensor 176 can be freely rotated about the hinge 172*p* such that the four wheels 73 are reliably brought into contact with the sheets P. Thus, the detection of the sheets P can be reliably and stably performed also in this exemplary embodiment.

In the above-described exemplary embodiments, the base is disposed on the body frame. However, the body frame may also function as the base.

Moreover, in the above-described exemplary embodiments, the sheet detecting apparatus is disposed on the body of the apparatus. However, the sheet detecting apparatus may be disposed inside the feeding cassette.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Patent Application No. 2005-291893 filed Oct. 5, 2005, and No. 2006-262854 filed Sep. 27, 2006, which are hereby incorporated by reference herein in their entirety.

What is claimed is:

1. An image forming apparatus comprising:

an image forming device configured to form an image on a recording material;

a storage device adapted to accommodate the recording material, the storage device including a movable recording material supporting member supporting the recording material thereon;

a detecting device configured to detect the recording material accommodated in the storage device, wherein the image forming device is controlled on the basis of detection outputs from the detecting device, wherein the detecting device is positioned facing the recording material supporting member and is able to come into contact with the recording material supported on the recording material supporting member;

a supporting portion supporting the detecting device so as to be rotatable;

a holding portion holding the supporting portion so as to be movable;

a first biasing member biasing the supporting portion from the holding portion toward the recording material; and a second biasing member biasing the detecting device from the supporting portion toward the recording material, wherein the biasing force of the first biasing member is larger than the biasing force of the second biasing member.

2. The image forming apparatus according to claim 1, further comprising a supplying member configured to supply the recording material to the image forming device, wherein the recording material supporting member is biased toward the supplying member.

3. The image forming apparatus according to claim 1, wherein the recording material supporting member is pivotable.

4. The image forming apparatus according to claim 1, wherein the detecting device has a contact portion at which the detecting device comes into contact with the recording material.

5. The image forming apparatus according to claim 4, wherein the contact portion includes a rotating member.

6. The image forming apparatus according to claim 1, further comprising:

a connecting portion at which the detecting device and the supporting portion are connected with each other includes a shaft and a hole; and a gap defined between the shaft and the hole, wherein the detecting device is movable in a direction perpendicular to the shaft.

7. The image forming apparatus according to claim 1, further comprising a main body from which the storage device is detachable therefrom, wherein a detecting direction of the detecting device is inclined toward a loading slot of the main body before the storage device is fitted into the main body through the loading slot.

8. The image forming apparatus according to claim 1, wherein the holding portion holds the supporting portion so as to be rotatable.

9. An image forming apparatus comprising:

an image forming device configured to form an image on a recording material;

a storage device adapted to accommodate the recording material, the storage device including a movable recording material supporting member supporting the recording material thereon;

a detecting device configured to detect the recording material accommodated in the storage device, wherein the image forming device is controlled on the basis of detection outputs from the detecting device, wherein the detecting device is positioned facing the recording material supporting member and is able to come into contact with the recording material supported on the recording material supporting member;

a supporting portion supporting the detecting device so as to be rotatable;

a holding portion holding the supporting portion so as to be movable, wherein the storage device is detachable from a main body of the apparatus, and wherein a detecting direction of the detecting device is oriented in a vertical direction by the weight of the detecting device before the storage device is fitted into the main body.

10. The image forming apparatus according to claim 9, wherein the holding portion holds the supporting portion so as to be rotatable.

* * * * *